Figure 1:
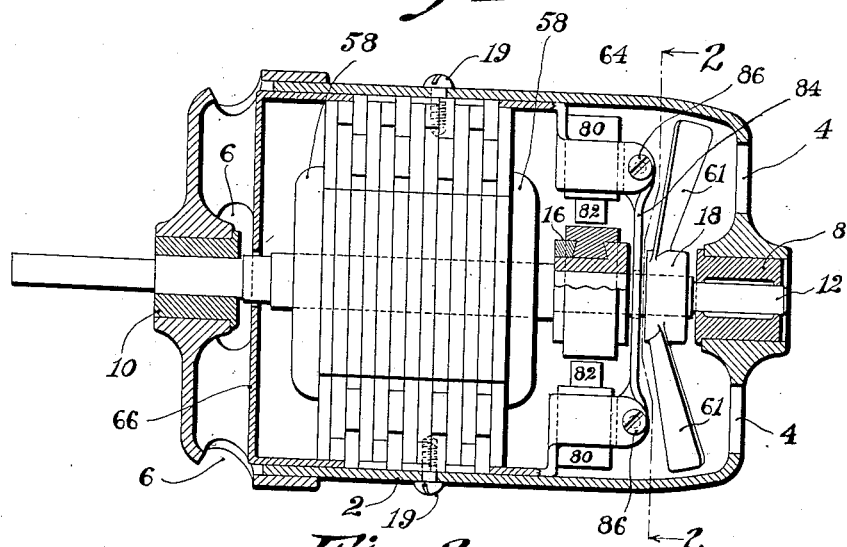

Mar. 27, 1923.

C. O. BERGSTROM ET AL 1,449,577

DYNAMO ELECTRIC MACHINE

Filed Aug. 18, 1919

2 sheets-sheet 1

Witness
B. L. Bakers

Inventors
Carl O. Bergstrom
Philippe de Clancey
by their Attorneys
Van Cover Frish & Hildreth

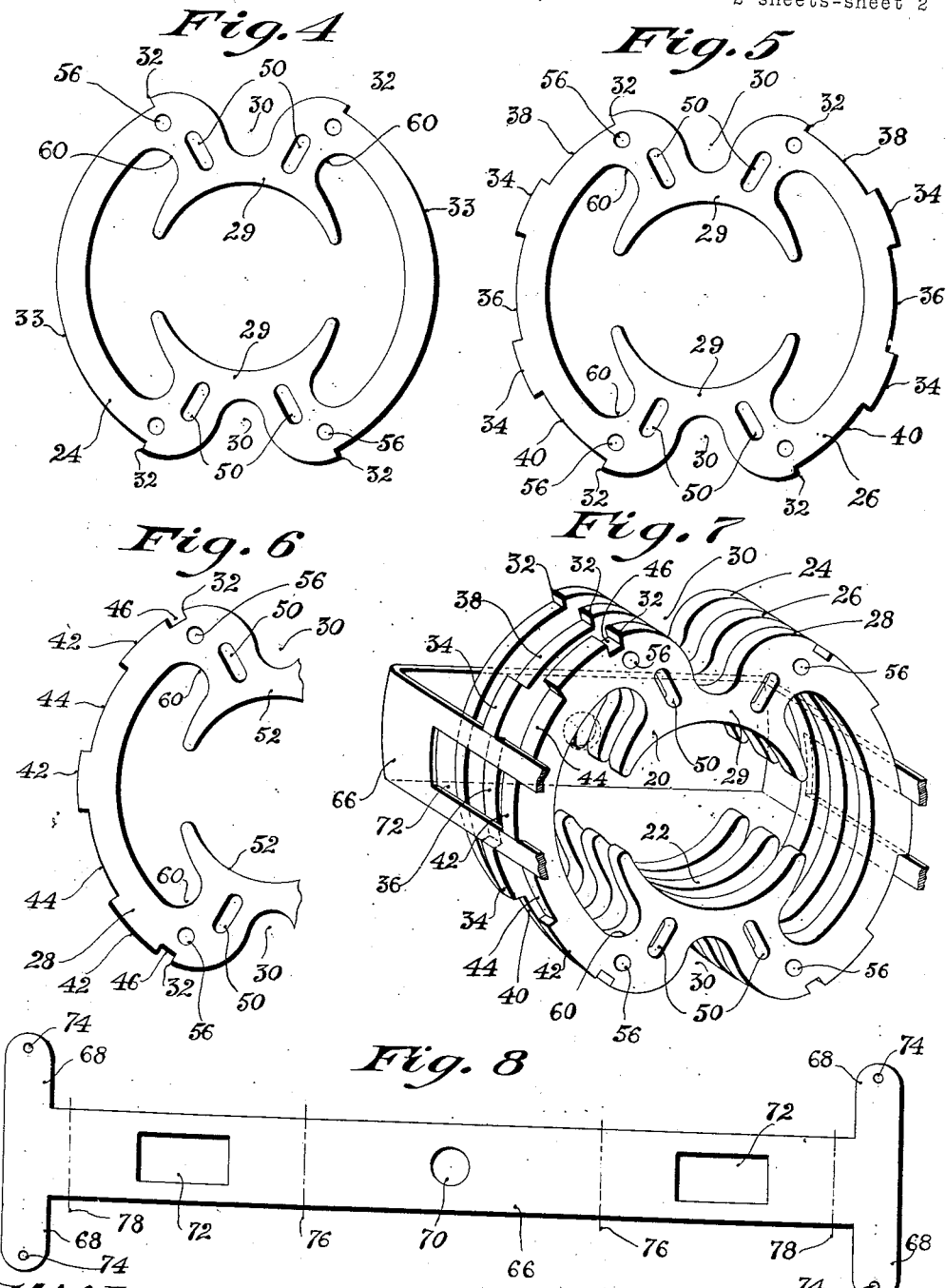

Patented Mar. 27, 1923.

1,449,577

UNITED STATES PATENT OFFICE.

CARL O. BERGSTROM AND PHILIPPE DE CLAMECY, OF BOSTON, MASSACHUSETTS, ASSIGNORS TO B. F. STURTEVANT COMPANY, OF BOSTON, MASSACHUSETTS, A CORPORATION OF MASSACHUSETTS.

DYNAMO-ELECTRIC MACHINE.

Application filed August 18, 1919. Serial No. 318,082.

*To all whom it may concern:*

Be it known that we, CARL O. BERGSTROM and PHILIPPE DE CLAMECY, citizens of the United States, both residing at Boston, in the county of Suffolk and Commonwealth of Massachusetts, have invented certain new and useful Improvements in Dynamo-Electric Machines; and we do hereby declare the following to be a full, clear, and exact description of the invention, such as will enable others skilled in the art to which it appertains to make and use the same.

The present invention relates to dynamo-electric machines, and more particularly to motors and generators.

With certain types of dynamo-electric machines such, for example, as the small motors which are employed for actuating desk fans, vacuum cleaners, washing machines and other office and domestic appliances, it is desirable and often necessary on account of the conditions of installation or use to reduce the weight and size of the motor as much as possible without reducing the amount of power developed. These motors are usually encased and difficulty has heretofore been experienced, when they are operated continuously for any substantial period of time, in maintaining their temperature within the safety limits of the insulation. Furthermore, where, as with the case of vacuum cleaners and desk fans, the hand of the user is liable to come into contact with the casing of the motor, a much lower temperature must be maintained within the motor than required by the insulation in order that the casing may not become so hot as to burn the hand or to cause apprehension that the motor is overheating and liable to damage if its operation is not immediately discontinued.

It is one of the objects of the present invention to increase the power or capacity of such dynamo-electric machines by increasing the rate of dissipation of the heat generated within the motor, thus permitting a greater current consumption with consequent development of greater power. A further object is to increase the working internal temperature practically to the safety limit as determined by the insulation, at the same time maintaining the temperature of the casing so low that not only will burning by accidental contact be prevented, but even fear of overheating will be avoided.

Cheapness of construction is a great desideratum with these small motors which have such extensive and universal use, and another of the objects of the present invention is to provide a motor which shall not only be efficient and durable in operation, but the parts of which may be cheaply constructed and assembled.

With these and other objects in view, as will be apparent to those skilled in the art from the following specification, the present invention consists in the devices and constructions hereinafter described and more particularly defined in the claim.

Figure 2:
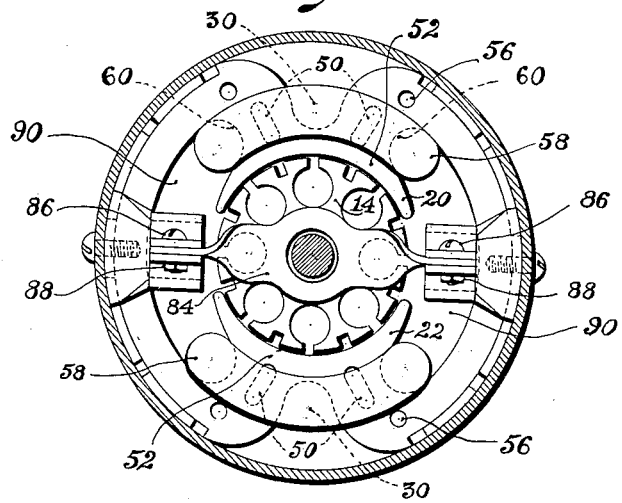
Figure 3:
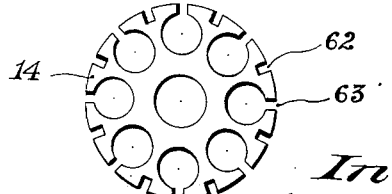

In the accompanying drawings which illustrate what is now considered to be the preferred form of the present invention, Figure 1 is a longitudinal, horizontal, sectional view of the improved motor, and Fig. 2 is a vertical, cross-sectional view on line 2—2, Fig. 1. Fig. 3 illustrates one of the laminations of the rotor or armature, and Figs. 4, 5 and 6 are views of the three types of laminations used in the stator or field magnets. Fig. 7 is a perspective of a portion of the stator, but with sections of the laminations separated from one another, illustrating the method of assembling the three types of laminations to form the stator and also the method of mounting the brush holder supporting yoke. Fig. 8 shows the stamping from which the yoke is formed.

The improved dynamo-electric machine shown in the drawings, which is a small motor, is adapted to be mounted within a casing of substantially cylindrical shape provided at the forward and the rear ends with walls having ventilating openings 4 and 6 and bearings 8 and 10 adapted to receive a shaft 12 supporting an armature 14, a commutator 16 and a fan 18. A field-magnet frame is secured by means of screws 19, to the casing 2, and comprises two field magnets or pole pieces 20 and 22.

The magnets are composed of a plurality of groups of laminations of three different types 24, 26 and 28 (Figs. 4, 5 and 6), each group containing laminations of only a single type. All the laminations are of substantially annular form with internal pole pieces 29, and with deep external recesses 30 opposite the pole pieces and between the shoulders 32, differing from each other only in the shape of their peripheral surfaces between the shoulders 32. The peripheries 33 of the type of laminations 24 (Fig. 4) are substantially smooth and circular between the bottoms of shoulders 32. The corresponding peripheries of the laminations 26 are provided with a pair of symmetrically disposed projections or fins 34 having circular outer faces of the same radius as the top of the shoulder 32, and being separated from each other by the recess 36, and from the shoulders 32 by the recesses 38 and 40. The bottoms of recesses 36, 38 and 40 are the same radius and curvature as the portions 33 of laminations 24. The similarly disposed peripheries of the laminations 28 are provided with projections or fins 42 in positions corresponding to the recesses 36, 38 and 40, but of less width than the recesses. The outer surfaces of projections 42 are of the same radius and curvature as fins 34, and are separated from one another by recesses 44 and from the shoulders 32 by recesses 46, all of which have the same radius and curvature as portions 33 of laminations 24. The recesses 44 are of greater width than the projections 34.

The field laminations are assembled, first, by making up groups each composed of a number of laminations of a single type, and then arranging the groups so that the types alternate, as illustrated in Fig. 7. When the field magnets are in place within the casing, the tops of the shoulders 32 and the outer circular surfaces of the various fins 34 and 42 are in contact with, or close proximity to, the inner surface of the cylindrical casing. Open air passages are thus formed in the periphery of the fields or stator, which passages are closed by the casing. These air passages vary in width and communicate with one another so that both direct and tortuous channels for the air are provided with consequent intermingling and eddying of the air currents and their flow against and around the fins. As a result the heat is quickly absorbed from the stator by the air and dissipated, preventing overheating of the motor.

Furthermore, since the casing itself forms one wall of the air passages, the air currents come into direct contact with the casing and absorb and carry away heat transmitted to the casing from the stator, thereby preventing heating of the casing to an objectionable degree.

The deep recesses 30 opposite the pole pieces 29 form relatively large, unobstructed air passages through which the air is forced, absorbing heat both from the stator and the casing.

It will be observed that only a relatively small portion of the outer surface or periphery of the stator contacts with the casing, the larger portions being separated from the casing by air spaces or passages. As a result the amount of heat transferred from the stator to the casing is limited and no difficulty is experienced in maintaining a relatively low temperature of the casing and a relatively high temperature in the stator.

The laminations 24, 26 and 28 are further provided with the radial slots or openings 50 which not only provide additional air passages through the stator, thereby assisting in the cooling thereof, but they also serve to reduce the armature cross magnetization, thereby improving the commutation and regulation. These openings 50 also aid in the assembly of the laminations to form the field frame, serving as means for mounting the laminations upon rods or similar assembly devices. The laminations are also provided with bolt-holes 56 through which bolts or rivets may be passed to secure the laminations and groups rigidly together to constitute the field-magnet frame.

The field coils or stator windings 58 are first wound and then placed over the pole pieces, being positioned in the bottom of recesses 60.

In order that the ventilating fan 18 may discharge its air directly against the interior of the casing and into the air passages, thus ensuring a high efficiency of operation and the maximum cooling effect, particularly on the casing the blades 61 of the fan are bent backwardly, as shown in Fig. 1, causing the air to be discharged in a diverging or expanding blast.

For the purpose of cooling the armature or rotor, longitudinal slots 62 have been formed in its periphery between the winding slots 63. Not only do these open slots 62 provide an increased radiating surface for the dissipation of heat, but they also cause a circulation of air over the surface of the rotor and pole pieces and in the air gap, both of which features assist in preventing overheating of the motor.

In order to provide a brush holder which shall be efficient in operation, yet which may be made and assembled at a minimum expense, we employ a stamping of sheet metal in the form of a long, narrow strip 66 with tabs or ears 68 extending laterally from each end and provided with the middle circular opening 70, the two rectangular openings 72 and the four small holes 74 near the extremity of each ear, all as illustrated in Fig. 8. The stamping is then bent into a substantially U-shaped yoke as shown in Fig. 1, being given right angle bends on lines 76 and 78, and the ears 68 are bent circularly to form split sleeves for receiving the bushing 80 of insulating material, carrying the brushes 82. The brush holder is mounted upon the stator in the manner illustrated in Figs. 1 and 7, the intermediate projections 42 of laminations 28 being received by the openings 72 in the parallel arms of the brush holder, while the projections 34 on laminations 26 receive between them the arms themselves. The parts fit tightly so that when forced into position the brush holder is held securely. The rotor shaft 12 passes through the circular opening 70 in the brush holder yoke.

In order to stiffen the brush holder where the brushes are mounted, a strap 84 is employed formed of a stamping having a shaft opening at its middle and two screws holes near each end, the ends being twisted at right angles to the body portion so that they may be clamped between the ears of the brush holder by means of the screw 86 and nut 88, which also serve to clamp the insulated bushings in the sleeves of the holder.

By means of the above-described construction, a dynamo-electric machine is provided which is of compact design, capable of developing high power although of small size, cheap to manufacture, and highly efficient and durable in operation. The rotation of the fan 18 effects a suction of air into the casing through the openings 4, forcing the air outwardly against the interior of the casing and into the core and through the various air spaces and passages, and finally out of the openings 6 in the opposite end of the casing, cooling efficiently and rapidly the parts of the machine.

While in the accompanying drawings we have shown, and in the foregoing specification we have described one preferred embodiment of our invention, it is to be understood that our invention is not limited thereto but may be embodied in other constructions and arrangements within the limits defined by the following claim.

What is claimed is:

A stator for dynamo-electric machines of substantially ring shape having internal pole pieces and an open slot on the outer periphery of the stator opposite the pole pieces extending substantially parallel with the axis of the stator and a pair of elongated substantially radially disposed openings in each pole piece adjacent the pole piece extending parallel to and one on each side of the open slot, the slot and openings serving to reduce armature cross magnetization.

CARL O. BERGSTROM.
PHILIPPE DE CLAMECY.